June 29, 1926.

L. L. BALLESTEROS

ENGINE COOLING MEANS FOR AUTOMOBILES

Filed Oct. 3, 1924   3 Sheets-Sheet 1

L. L. Ballesteros
INVENTOR

BY Victor J. Evans
ATTORNEY

WITNESS:

June 29, 1926.

L. L. BALLESTEROS

ENGINE COOLING MEANS FOR AUTOMOBILES

Filed Oct. 3, 1924  3 Sheets-Sheet 2

1,590,874

L. L. Ballesteros, INVENTOR

BY Victor J. Evans

ATTORNEY

WITNESS:

June 29, 1926.

L. L. BALLESTEROS

ENGINE COOLING MEANS FOR AUTOMOBILES

Filed Oct. 3, 1924  3 Sheets-Sheet 3.

R. Q. Thomas
WITNESS:

L. L. Ballesteros INVENTOR
BY Victor J. Evans
ATTORNEY

Patented June 29, 1926.

1,590,874

UNITED STATES PATENT OFFICE.

LUIS L. BALLESTEROS, OF CALEXICO, CALIFORNIA.

ENGINE-COOLING MEANS FOR AUTOMOBILES.

Application filed October 3, 1924. Serial No. 741,488.

My present invention pertains to the cooling of internal combustion engines employed in automobiles; and it has for its object to provide a peculiar and advantageous auxiliary cooling means which may be conveniently put into and out of operation by the driver of the automobile as conditions require.

Other objects and practical advantages of the invention will be fully understood from the following description and claims, when the same are read in connection with the drawings, accompanying and forming part of this specification, in which:—

Figure 3:
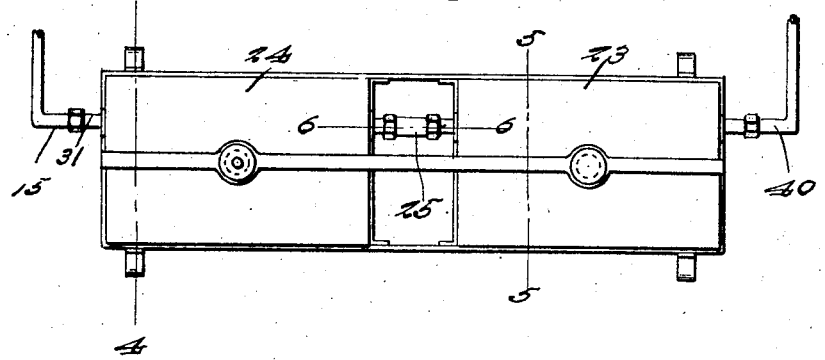
Figure 3 is an enlarged detail plan view illustrating the auxiliary tank and the auxiliary radiator.
Figure 4:
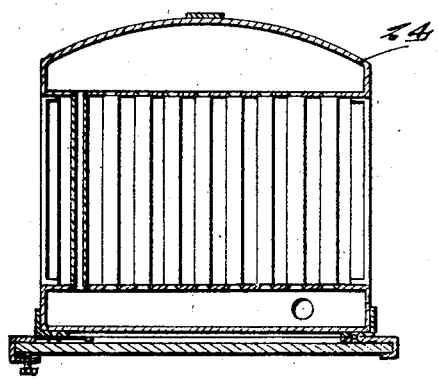
Figure 5:
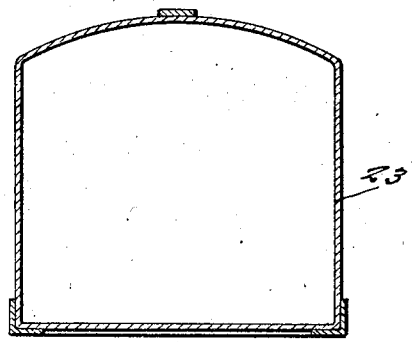

Figures 4 and 5 are enlarged cross-sections taken in the planes indicated by the lines 4—4 and 5—5, respectively, of Figure 3.

Figure 6:
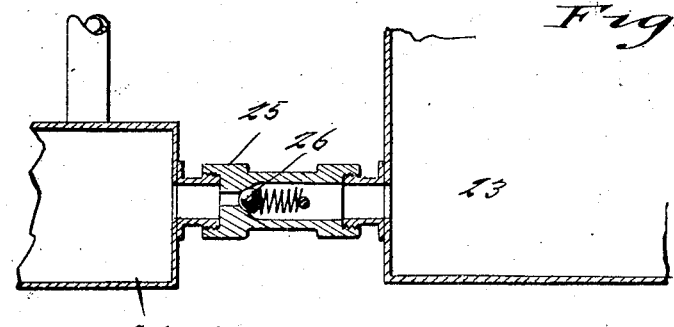

Figure 6 is an enlarged longitudinal vertical section taken in the plane indicated by the line 6—6 of Figure 3.

Figure 7:
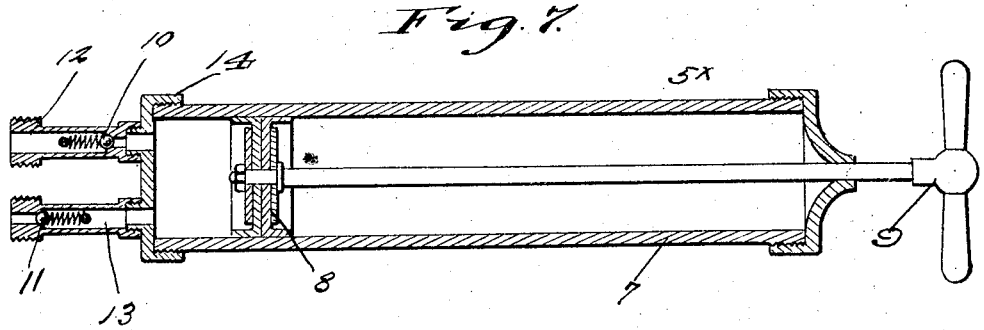

Figure 7 is an enlarged longitudinal section of the hand pump employed in my improvement.

Figure 8:
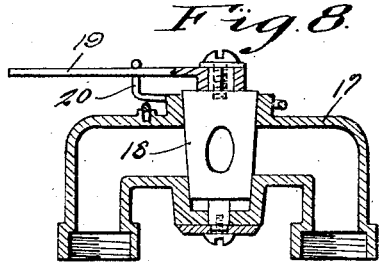

Figure 8 is an enlarged detail view of the hand controlled valve comprised in the improvement.

Figure 9:
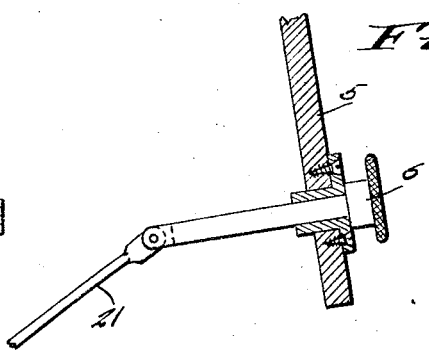

Figure 9 is an enlarged detail view of the handle for operating said valve.

Figure 10:
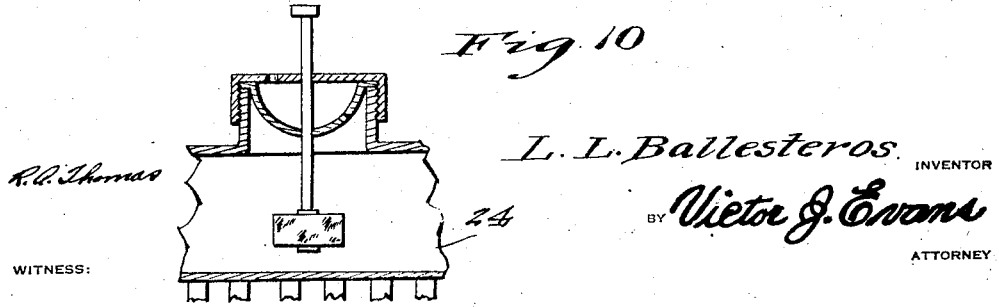

Figure 10 is a fragmentary sectional view taken through the upper portion of the auxiliary radiator which forms a portion of the present invention.

Similar numerals of reference designate corresponding parts in all of the views of the drawings.

Figure 2:
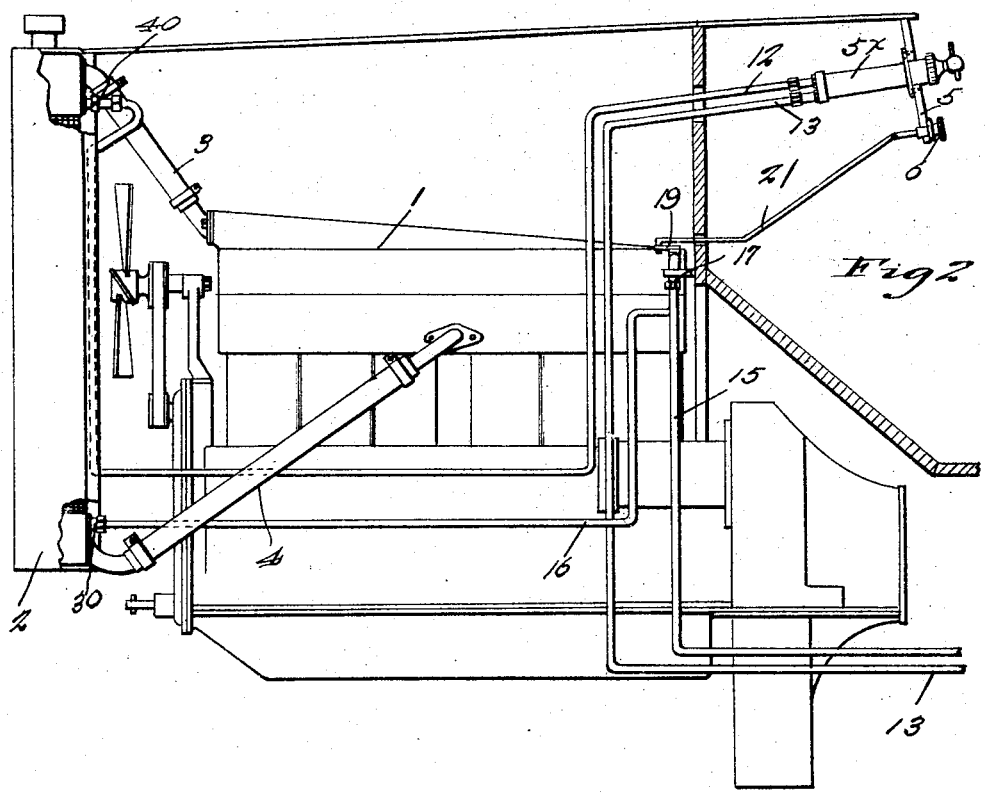
Figure 2 is an enlarged longitudinal vertical section showing a portion of my improvement.

The internal combustion engine 1 is connected with a radiator 2 in the ordinary well known manner or in any other manner compatible with the purpose of my invention, the engine being connected by conduits 3 and 4 with the radiator for circulation purposes, as shown in Figure 2.

In the preferred embodiment of my invention, I employ on the instrument board 5 of the automobile or at any other appropriate point or points in the automobile a hand pump 5× and a rectilinearly movable handle 6. As shown in Figure 7 the pump 5× in addition to a cylinder 7 includes a piston 8 operable through the medium of a handle 9, and non-return valves 10 and 11 relatively arranged as illustrated in conduits 12 and 13 extending from the forward head 14 of the cylinder.

My improvement also comprises conduits 15 and 16 connected by a crown joint 17, Figure 2, and in the said crown joint 17 as best shown in Figure 8 is a turn valve 18, associated with a crank 19 for the turning of the valve and with a spring 20 for closing the valve when the same is released. The said valve crank 19 is connected to a link rod 21, and the said link rod 21, in turn, is connected to the forward end of the handle 6. From this it follows that when the handle 6 is pulled rearwardly the valve 18 will be opened to establish communication between the pipes 15 and 16, while when the handle 6 is released the said valve 18 will be promptly closed by the tendency of the spring 20.

I prefer to arrange the valve 18 vertically and the crank 19 horizontally as shown.

Figure 1:
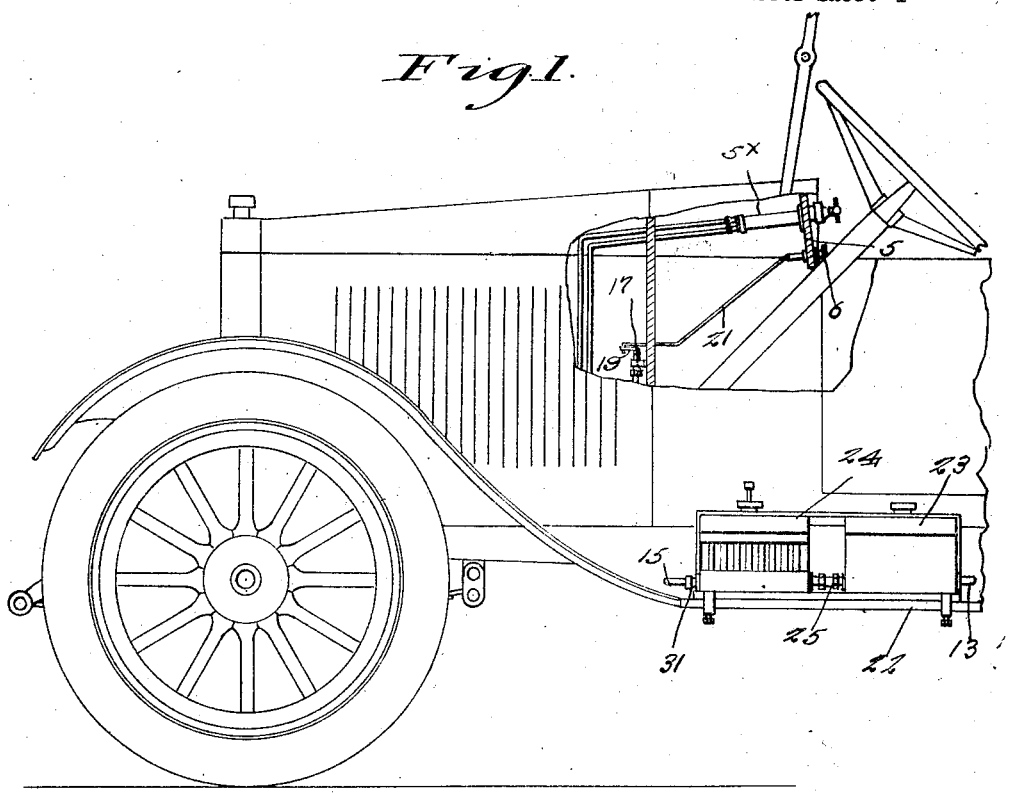
Figure 1 is a view partly in side elevation and partly in section showing a portion of an automobile equipped with the preferred embodiment of my invention.

Located by preference on the running board 22 of the automobile is a tank 23 for water and a radiator 24 which latter will hereafter be referred to as the auxiliary radiator. The said auxiliary radiator is disposed in front of the tank 23 and the two are connected together by an interposed conduit 25, Figures 1 and 6 in which is preferably employed a non-return valve 26.

The before mentioned pipe 16 is connected at 30 to the usual radiator 2 of the automobile, and the before mentioned pipe 15 is connected to the auxiliary radiator 24 at 31. Thus when the valve 18 is opened the usual radiator 2 will be in connection with the auxiliary radiator 24. The tank 23 is connected by the before mentioned conduit or pipe 13, Figures 1 to 3 with the cylinder 7 of the hand pipe 5×, and by the before mentioned pipe 12 the said hand pump 5× is connected with the usual radiator at the point 40, Figure 2.

My improvement is designed for use when the engine 1 becomes unduly heated or is likely to become unduly heated, it being simply necessary when the improvement is to be put into operation for the driver to open the valve 18 and then reciprocate the piston 8 in the cylinder 7 of the hand pump. Manifestly while the valve 18 is held open and the piston 8 of pump 5ˣ is reciprocated, water will be pumped from the tank 23 into the usual radiator 2 at the point 40 and in consequence of the water in the tank 23 being comparatively cool undue heating of the engine will be precluded. From the usual radiator 2 the water passes through the conduit 16, crown joint 17 and conduit 15 to the auxiliary radiator 24, and from said auxiliary radiator 24 the water passes through the conduit 25 back to the tank 23. When it is not desired to use the auxiliary cooling means the handle 6 is released for the closure of the valve 18 and the operation of the hand pump 5ˣ is stopped whereupon the cooling of the engine will be effected in the usual manner and by the usual means illustrated in Figure 2.

Notwithstanding the practical advantages of my improvement it will be readily apparent that the improvement is simple and inexpensive in construction and is susceptible of being expeditiously and easily applied to automobiles such as at present in use.

I have specifically described the preferred embodiment of my invention in order to impart an exact understanding of the said embodiment. I do not desire, however to be understood as confining myself to the specific construction disclosed, my invention being defined by my appended claim within the scope of which modifications may be made without departure from my invention.

Having described my invention, what I claim and desire to secure by Letters-Patent, is:—

In an automobile and in combination with the liquid cooling means of the internal combustion engine of the automobile, auxiliary cooling means comprising a tank for liquid, a radiator complementary to and connected with said tank, conduit connections between said auxiliary tank and radiator and the liquid cooling means of the engine, a manually controlled means for controlling connection between the liquid cooling means of the engine and the auxiliary tank and its radiator, and manually operable means for causing liquid to circulate from the auxiliary tank to the liquid cooling means of the engine and back to the radiator complementary to said tank.

In testimony whereof I affix my signature.

LUIS L. BALLESTEROS.